United States Patent [19]

Druffel et al.

[11] 4,137,923
[45] Feb. 6, 1979

[54] CHAFF SPREADING ATTACHMENT FOR HARVESTERS

[76] Inventors: Donald G. Druffel; James E. Druffel, both of Box 104, Colton, Wash. 99113

[21] Appl. No.: 776,508

[22] Filed: Mar. 11, 1977

[51] Int. Cl.² ............................................ A01F 12/00
[52] U.S. Cl. ................... 130/27 R; 130/22 A; 56/14.6
[58] Field of Search ............... 56/14.5, 14.6, 12.8–13.4; 130/21–26, 27 R

[56] References Cited

U.S. PATENT DOCUMENTS

| | | | |
|---|---|---|---|
| 3,494,115 | 2/1970 | Ashton et al. | 56/12.8 |
| 3,603,063 | 9/1971 | Stroburg et al. | 56/14.6 |
| 3,732,674 | 5/1973 | Guillory | 56/13.1 |
| 3,984,893 | 10/1976 | Ashley | 56/13.1 X |

Primary Examiner—Russell R. Kinsey
Attorney, Agent, or Firm—Wells, St. John & Roberts

[57] ABSTRACT

A chaff spreading attachment that is mountable adjacent the chaff discharge of a harvester, wherein the chaff discharge is located elevationally below and forward of a straw or stalk discharge. The chaff spreading attachment is utilized to create transverse air currents to spread the chaff over the width of the swath taken by the harvester. The attachment includes two oppositely facing fans that are rotated in the same direction about a transverse axis by mechanism connected to a power source provided by the harvester.

6 Claims, 4 Drawing Figures

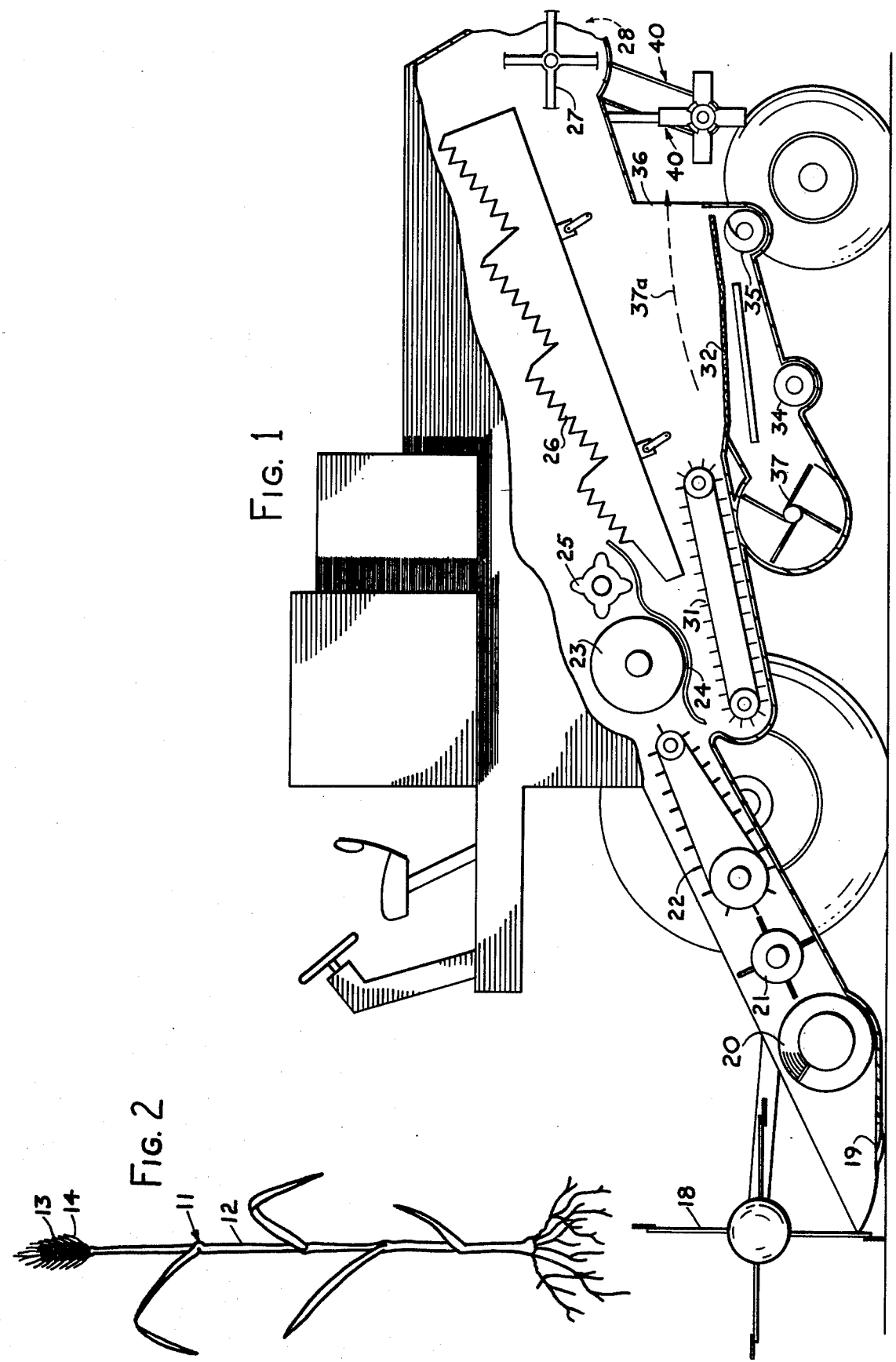

CHAFF SPREADING ATTACHMENT FOR HARVESTERS

BACKGROUND OF THE INVENTION

Modern agricultural practices have led to the development of various implements for use in "no till" farming. "No till" farming takes advantage of the residue left behind harvesters from the preceding season's crop. In other words, a harvested wheat field is left untilled after harvesting with the stocks and roots remaining intact and the cut straw and chaff from the wheat plants remaining on the ground surface. The distinct advantage of such farming is that the top soil is held firmly in place by the straw and chaff and particularly by the roots of the previous wheat crop. The soil is well-insulated and erosion is considerably reduced. "No till" farming, however, is not without problems. Conventional harvesting implements ordinarily produce windrows of straw and chaff discharge behind the harvesting implement. Unless spread, these windrows present difficulty in the next successive planting as the thickness from the surface of the chaff and straw to the earth is considerable and makes seed drilling substantially more difficult. Of course a further problem is the loss of the insulation effect in the areas not covered by the straw and chaff. Additionally heavy concentration of chaff in a windrow appears to "poison" the soil immediately below the windrows. It is therefore desirable to provide some mechanism by which the straw and chaff may be spread across the width of the swath taken by the machine during the harvesting operation. In doing so, both the chaff and straw would be evenly distributed about the entire field thereby gaining the maximum advantage from the crop residue.

Most harvesting implements have a separate discharge for the stalks (straw) and the chaff. The straw is ordinarily discharged through an elevated rear discharge opening. Since the straw is composed of relatively solid pieces of material, it may be physically deflected or projected transverse to the path of the harvesting implement. This is often done with deflector baffles or by a horizontally rotating spreader. Thus, the straw residue does not create a substantial problem as does the chaff.

The chaff is handled somewhat differently than the straw in that it is extremely light by nature and does not lend itself to physical deflection. Therefore, the chaff is directed through its own separate opening forward and below the straw discharge. Since there can be no effective physical deflection provision for the chaff, it collects in a windrow having approximately the same width as the chaff discharge opening at the rear of the harvester.

It is a primary object of the present invention to provide an attachment for different models of conventional harvesting implements that will effectively and evenly spread chaff from the harvesting operation across the entire width of the swath taken by the implement.

A further object is to provide such an attachment that may be driven directly from conventional drive mechanisms provided on the harvesting implement.

A still further object is to provide such an attachment that may be easily and quickly mounted to substantially any currently available harvesting implement of the type that produces a separate chaff and straw discharge.

These and still further objects and advantages will become apparent upon reading the following description which, taken with the accompanying drawings, disclose a preferred form of the present invention. However, it is to be understood that the drawings and description are in no way intended to restrict the scope of my invention. It is well understood that slightly different variations of the disclosed apparatus may be produced without departing from the scope of the invention. Therefore, it is the purpose of the claims found at the end of this specification to precisely define and restrict the scope of what I claim as my invention.

BRIEF DESCRIPTION OF THE DRAWINGS

A preferred form of the present invention is illustrated in the accompanying drawings in which:

FIG. 1 is a schematic side elevational view of a harvester incorporating the present invention;

FIG. 2 is a pictorial view of a wheat plant;

DETAILED DESCRIPTION OF A PREFERRED EMBODIMENT

Figure 3:
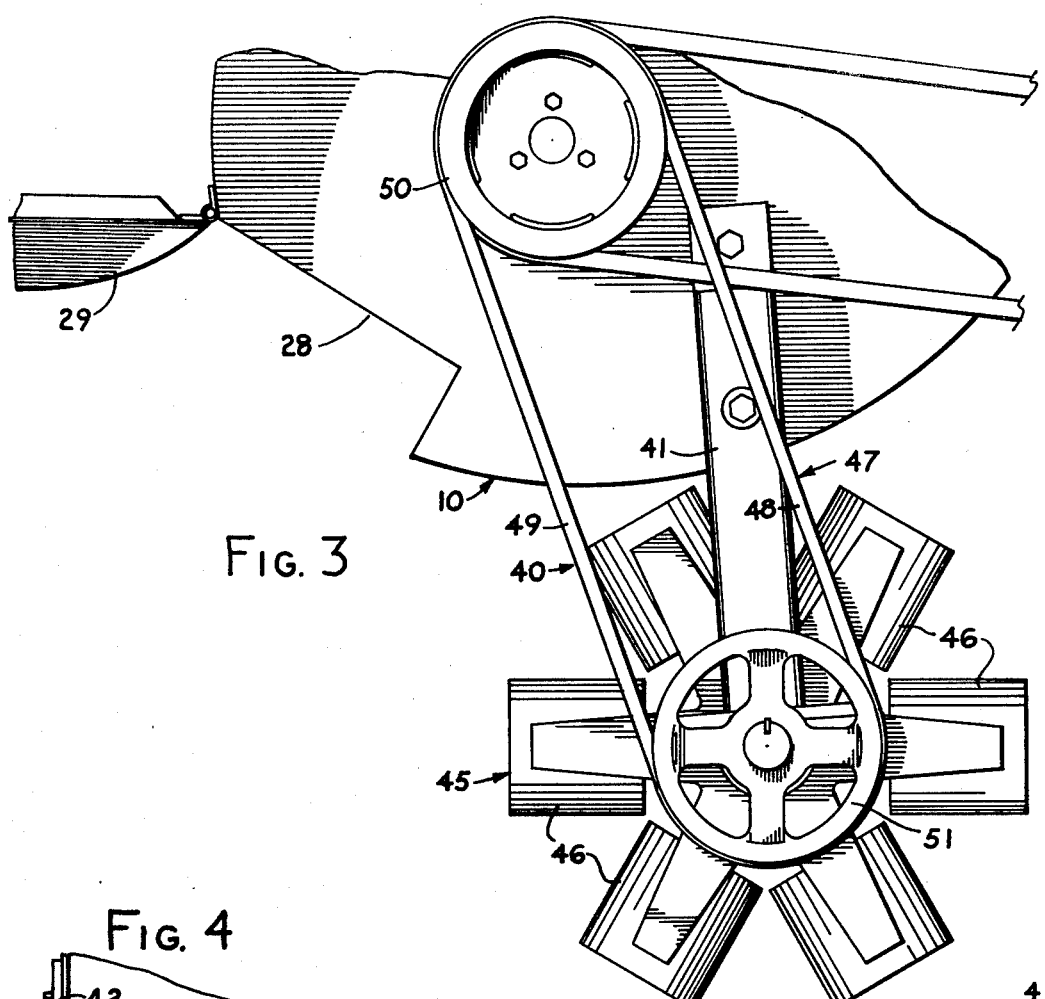
FIG. 3 is an enlarged end elevational view of the present invention shown mounted to a harvesting implement.

The present invention is shown in the drawings mounted to a harvester that is generally designated by the reference numeral 10. The harvester is shown in schematic form only in order to present a general description of the harvesting process. The implement may be of the type utilized to harvest several different crops including wheat, grass, peas, beans, barley, oats, and other crops having a stalk that supports a seed or grain pod at an upper end thereof. An example of a typical wheat plant is illustrated in FIG. 2 at 11. The plant includes an upright stalk 12 with grain 13 at the upper end thereof. The grain is encased within protective skin or husk that is ordinarily termed "chaff" and is generally designated at 14. The "chaff" is made up of protective coverings and small particles of the stalks and leaves that become separated from the rest of the plant during the harvesting process. Ordinarily the "straw" is made up of the plant stalk and portions of the leaves attached thereto. The straw or stalk remnants are heavier than the lightweight chaff and the two are usually handled separately. Conventional harvesters ordinarily have a discharge opening for the straw or stalk remnants and an independent opening or discharge for the chaff.

The harvester of a typical configuration includes a reel 18 at a forward end for lifting and holding the crop upright while a cutting head 19 cuts the stalks adjacent the ground surface. The severed stalks and grain heads (still attached) are led by a transverse auger 20 to a feeder wheel 21. Wheel 21 pushes the material onto a pusher belt 22. The stalks and heads become engaged between a threshing cylinder 23 and a "concave" 24. The threshing cylinder 23 rotates to press the stalks downwardly to begin removing the heads from the stalks. Disengagement of the heads is further induced by a beater 25 that is located downstream of the threshing cylinder 23. It also acts against the concave 24.

The concave 24 is made up of a number of elongated rods or bars that are bent in a configuration shown in FIG. 1 and separated transversely along the rotational axes of the threshing cylinder and beater. The grain heads fall between the rods while the stalks are carried on rearwardly. Some heads will pass between the cylinders and beater while still intact with the stalk. Therefore, the harvesting implement usually has a form of "straw walker" 26 that is made up of a number of toothed plates that are reciprocated (vibrated) in opposite directions. These walkers 26 complete the job left unfinished by the threshing cylinder and beater by removing remaining grain heads from the stalks.

The headless stalks then are gradually shifted rearwardly where they eventually fall into a straw chopper 27 and are discharged through a straw discharge opening 28 (FIG. 3). A blowing mechanism (not shown) may be supplied to project the straw outwardly through the opening. Also, in place of the chopper, a rotating deflector may be provided immediately below the discharge to physically engage and throw the straw transversely across the width of the swath being taken. Other forms may also be utilized. For example, as shown in FIG. 3, a finned deflector 29 is provided (usually utilized in conjunction with a blowing unit) for physically deflecting the rearwardly projected straw transversely in relation to the path of the harvester.

The heavier straw particles may be handled physically since they have sufficient weight and volume to be physically acted upon. Thus, the deflector plates and spreading bars are effective in spreading the straw material across the width of the implement swath.

The grain heads that have been removed from the stalks fall either through the concave 24 or between the straw walkers 26 downwardly onto several other mechanisms provided for the further separation of the grain from the chaff. The heads falling from the cylinder and beater are engaged and carried rearward by a grain chain 31. Chain 31 moves the heads and grain rearwardly onto sieves 32 that may be continuously vibrated. Heads and loose grain fall directly from the walkers onto the sieves. The sieves are arranged such that the much heavier grain seed will fall through the sieve openings while the chaff and small straw and leaf particles are held separate by a forced stream of air. The grain is then collected by a grain auger 34 and delivered to an appropriate storage area. Grain heads that have not been separated from the chaff will work their way rearwardly and drop into a tailing auger 35 where they are removed and redeposited onto the concave where they again go through the process in order to remove the chaff.

The chaff is blown outwardly of the havester through a chaff discharge 36. It is important to note that the chaff discharge is forward of and elevationally below the straw discharge 28. Since the chaff particles are too small to be physically handled, a chaff blower or fan 37 is provided to direct a chaff air current 37a upwardly through the sieves 32 and out through the chaff discharge 36. The air current produced by the fan 37 carries the chaff up to entrain the chaff therein and outwardly through discharge 36 while the heavier grain seeds fall through the sieves and settle within the trough for the grain auger 34. The chaff air current 37a is of sufficient velocity to carry the chaff beyond the discharge 36 in a longitudinal direction.

The present invention is concerned with the chaff that is blown through the discharge 36 that would ordinarily fall into a windrow of substantially equal width to that of the chaff discharge. The present invention is comprised of an attachment generally designated by numeral 40. It is utilized to redirect the air current 37a transversely outward to both sides of the harvester and allow the chaff to settle to the ground in a much wider swath or area than the chaff discharge. Preferably the chaff is spread across the entire width of the swath taken by the harvester as it moves through the field.

The attachment is mounted to the implement 10 by a pair of depending brackets 41. Brackets 41 may be attached to the implement through conventional bolt and nut assemblies 42. The brackets are attached to the implement such that the lower ends thereof are situated adjacent opposite sides of the chaff discharge 36. The bracket ends are also slightly below discharge 36.

Figure 4:
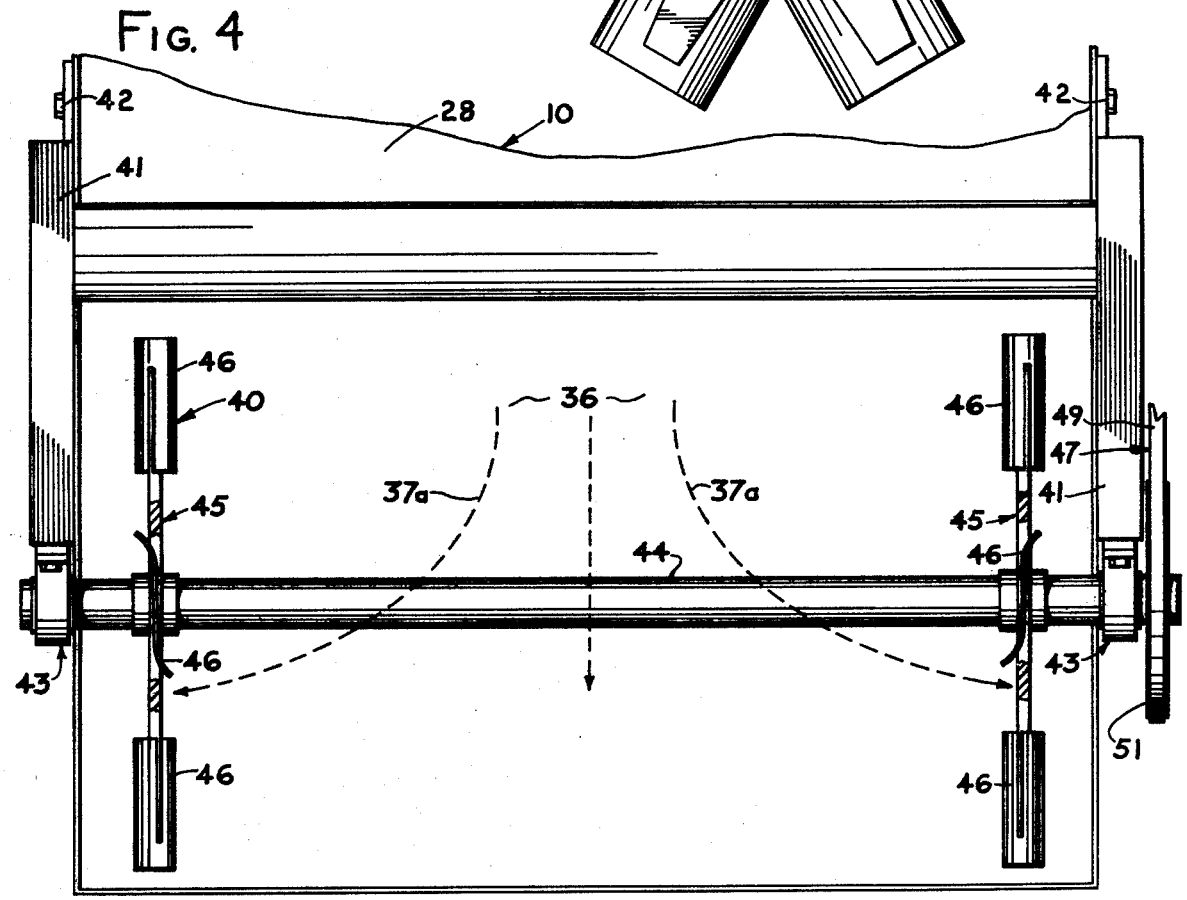
FIG. 4 is a rear elevational view of the present invention.

The lower ends of brackets 41 mount bearing means 43. Bearing means 43 are comprised of conventional roller or ball bearings that freely rotatably carry an elongated shaft 44. The bearings define the rotational axis for shaft 44 as transverse to the direction of forward movement for the associated harvesting machine. The shaft 44 extends across the entire width of the chaff discharge 36 in the air stream 37a. (FIG. 4). It should be noted that the shaft 44 need not be continuous across the discharge. The fans could also be mounted to separate shafts and each rotated by its own drive source on the adjacent harvester structure. Preferably though, the fans are to be substantially coaxial, rotating about a single horizontal axis.

A pair of fans 45 are mounted to shaft 44. They are located adjacent to the outside limits of the chaff discharge 36 and near the outer perimeter of the normal air stream 37a. The fans 45 are made up of a plurality of blades 40. The number of blades may vary; for example, a four blade fan is shown in FIG. 1 and a six blade fan in FIG. 3. The pitch of the blades 46 on one fan 45 is opposite to the pitch of the blades on the remaining fan. The fans are arranged such that when the shaft and fans are rotated in one direction, the blades will divide and pull the air streams 37a outward to both sides of the harvester to form air currents that will carry the exhausted chaff transversely of the harvester to be spread across the entire width of the swath taken by the cutting head 19.

The fans 45 are rotated by a drive means that is generally indicated at 47. Drive means 47 basically includes a linkage 48 that is interconnected with existing drive mechanisms of the harvester to transmit rotational motion to the fans. Specifically, drive means 47 includes a flexible drive belt 49 that is trained about a drive pulley 50 on the harvester and a driven pulley 51 of the present attachment. The drive pulley 50 may be connected to the shaft that operates the straw chopper 27, or the belt may be connected to another convenient rotated shaft in the direct vicinity of the chaff discharge 36. As noted above, if the fans are to be mounted to separate shafts, then a separate drive mechanism may be provided for each fan (similar to that shown in the drawings and described herein).

The driven pulley 51 is keyed to the shaft 44. The overall diameter of the driven pulley 51 is determined in relation to the diameter and operational rpm of the drive pulley 50 so the fans will not be turned below a minimum rpm. It is preferable that the fans be turned at a sufficient rpm to divide the air current 37a and form transverse air currents that move in opposite directions with each at a velocity of 600 cubic feet per minute. This figure has been calculated to be the minimum required air velocity to divert the air stream 37a and to carry chaff across the entire width of a swath taken by a standard width cutting head 19. When the implement is operated at a higher speed, the rpm of the drive pulley may correspondingly increase in velocity to accommodate increasing volumes of chaff being delivered through the chaff discharge 36.

It is noted that the fans are spaced transversely by a substantial distance. Therefore, not all the chaff will be spread laterally of the fans. Some chaff will not be drawn into the transverse air current and will fall to the ground directly below the chaff discharge 36. Therefore, a relatively even distribution of the chaff is achieved across the entire harvester width as it moves across the field.

It is understood that minor modifications in form and design may be made without departing from the intended scope of my invention. Therefore, only the following claims are to be taken as distinct definitions of what I claim to be my invention.

What I claim is:

1. A chaff spreading attachment for harvesters of the type used to harvest wheat, peas, beans and the like and which includes a rearward straw or stalk discharge and a separate chaff discharge elevationally below and forward of the straw or stalk discharge to emit chaff entrained in a longitudinal chaff discharge air stream, said spreading attachment comprising:

brackets adapted for mounting the attachment to the harvester adjacent to the chaff discharge;

bearing means on the brackets adjacent the chaff discharge;

fans carried by the bearing means on opposite sides of the chaff discharge and in the path of the chaff discharge air stream;

wherein the bearing means carries the fans for rotation about axes that are transverse to the intended forward path of travel for the harvester;

wherein the fans include blades with the blades of one fan having a pitch opposite the pitch of the other fan so when both fans are rotated in the same direction, the blades will divide and divert the chaff discharge air stream into transverse oppositely moving air currents leading from the chaff discharge; and drive means for rotating the fans at sufficient velocity to spread the chaff transversely from the chaff discharge the full width of a swath taken by the harvester as it is moved along a field.

2. The attachment as set out by claim 1 wherein the drive means is comprised of a linkage adapted to interconnect at least one of the fans with the existing drive mechanism for the harvester.

3. The attachment as set out by claim 1 wherein the drive means is controlled to operate the fans to produce air currents of 600 cubic feet per minute minimum adjacent the blades thereof.

4. The attachment as set out by claim 3 wherein the fans are connected by a common shaft means for rotating the fans in unison and wherein the drive means is comprised of a linkage adapted to interconnect the fans with the existing drive mechanism for the harvester.

5. The attachment as set out by claim 4 wherein the linkage is comprised of a flexible drive belt and a driven pulley operatively connected to the fans;

wherein the belt is mounted to a drive pulley on the harvester; and wherein the driven pulley diameter is related to the diameter of the drive pulley so as to effect the RPM of the fans in response to rotation of the drive pulley to produce to 600 cubic feet per minute air currents at correspondingly minimum operating speeds of the harvester.

6. The attachment as defined by claim 1 wherein the fans are fixed to a single shaft that is rotatably carried by the bearing means.

* * * * *